United States Patent
Jaggi et al.

(10) Patent No.: US 8,248,751 B2
(45) Date of Patent: Aug. 21, 2012

(54) DRIVE SYSTEM FOR VARIABLE VACUUM CAPACITOR

(75) Inventors: Manuel Jaggi, Jegenstorf (CH); Walter Bigler, Heitenried (CH)

(73) Assignee: Comet AG, Flamatt (CH)

( * ) Notice: Subject to any disclaimer, the term of this patent is extended or adjusted under 35 U.S.C. 154(b) by 266 days.

(21) Appl. No.: 12/676,367

(22) PCT Filed: Sep. 4, 2007

(86) PCT No.: PCT/EP2007/059236
§ 371 (c)(1),
(2), (4) Date: Mar. 4, 2010

(87) PCT Pub. No.: WO2009/030271
PCT Pub. Date: Mar. 12, 2009

(65) Prior Publication Data
US 2010/0202094 A1    Aug. 12, 2010

(51) Int. Cl.
*H01G 5/01* (2006.01)
(52) U.S. Cl. ........ 361/278; 361/273; 361/277; 361/280; 361/283.3; 361/290
(58) Field of Classification Search .................. 361/277, 361/287, 279–280, 290–292, 272–273, 278, 361/283.3
See application file for complete search history.

(56) References Cited

U.S. PATENT DOCUMENTS

| | | | | |
|---|---|---|---|---|
| 3,151,383 A | * | 10/1964 | Royston | 29/25.42 |
| 3,675,093 A | * | 7/1972 | Russo et al. | 361/296 |
| 3,751,725 A | | 8/1973 | Stavrou | |
| 7,854,046 B2 | * | 12/2010 | Horn et al. | 26/18.6 |
| 2007/0187651 A1 | * | 8/2007 | Naruse et al. | 252/500 |

FOREIGN PATENT DOCUMENTS

| | | |
|---|---|---|
| ES | 2024304 | 2/1992 |
| JP | 05251269 A | 9/1993 |
| JP | 10106888 A | 4/1998 |
| JP | 11067590 A | 3/1999 |
| JP | 11097293 A | 4/1999 |

OTHER PUBLICATIONS

International Search Report for corresponding International Application PCT/EP2007/059236.

* cited by examiner

*Primary Examiner* — Nguyen T Ha
(74) *Attorney, Agent, or Firm* — WRB-IP LLP

(57) ABSTRACT

A mechanical drive system for a vacuum capacitor is provided and includes a drive screw and a nut, wherein the nut is arranged in a housing of the vacuum capacitor, wherein the drive screw is screwed through the nut, wherein a first electrode is arranged on one side of the drive screw, wherein, by a rotation of the drive screw, the first electrode is movable relative to a second electrode, and wherein the nut is at least partially manufactured out of a plastic material.

7 Claims, 2 Drawing Sheets

DRIVE SYSTEM FOR VARIABLE VACUUM CAPACITOR

BACKGROUND AND SUMMARY

The present invention relates to a drive system for a variable vacuum capacitor.

Variable vacuum capacitors often comprise a first set of electrodes movably arranged with respect to a second set of electrodes. The electrodes may be arranged, for example, as concentric rings. Principally, in a variable vacuum capacitor, a first set of concentric rings may be moved into a second set of concentric rings. Due to such a movement, the area is increased of parts of the first concentric rings and of parts of the second concentric rings that lie opposite to each other. This leads to an increase of the relevant active area and therefore to an increase of the capacitance of the variable vacuum capacitor. The relative movement of the first and the second electrodes is performed by means of a mechanical drive system. Such a mechanical drive system may comprise a drive screw and a nut. The drive screw may be manufactured out of stainless steel and the nut may be manufactured out of lead bronze. Apart of the electrodes and the drive system, a variable vacuum capacitor includes further elements. These further elements may comprise, for example, a housing bottom, an insulator, a housing top and a spring bellow. A first set of electrodes may be arranged in the housing bottom. Together with the spring bellow and the drive system, a second set of electrodes may be arranged in the housing top. By means of the drive system, the second set of electrodes can be moved in a given direction. The insulator may be arranged between the housing bottom and the housing top. The vacuum of the vacuum capacitor is basically surrounded by parts of the housing top and the bellows on one side, and by parts of the housing top, the insulator and the housing bottom on the other side.

Variable vacuum capacitors are used in a wide variety of industrial applications. Such applications comprise radio broadcasting systems, manufacturing systems for flat panel displays, manufacturing systems for semiconductors, or other industrial applications. For such applications, variable vacuum capacitors are needed capable of withstanding currents of about 50 A to 200 A, or currents of up to 900 A, or higher currents, and voltages of up to 90 kV, or higher voltages. The range of the variable capacitance of a variable vacuum capacitor may be 20 pF for the lowest value and 5000 pF for the highest value. Depending on the application, a variable vacuum capacitor may be constructed to provide other ranges of a variable capacitance. Further requirements for variable vacuum capacitors may comprise operating conditions as, for example, a certain nominal frequency, a temperature range for running the capacitor, and other requirements.

Variable vacuum capacitors have to be constructed for a long lasting operational life. Therefore, the parts of a variable capacitor have to be manufactured in a high quality. In recent years, the requirements regarding the speed for changing the capacitance of a variable vacuum capacitor have increased. Basically, a change of the capacitance of a variable vacuum capacitor is performed by rotating the drive screw. By means of such a rotation, the capacitance of the variable vacuum capacitor is changed accordingly. If a last change of the capacitance is needed, a high rotation speed of the rotating screw is needed equally well. In recent years, the required rotation speed has increased from about 100 rpm to 600 rpm or higher. These demands have led the manufacturers to introduce new hardening techniques for the drive screw and to introduce new lubricants. However, the results achieved by these techniques have not fully satisfied the needed requirements, especially with respect to the durability of the drive system.

It is desirable to propose a new drive system for a variable vacuum capacitor, which drive system does not have the drawbacks of the prior art. In particular, the new drive system should have an improved life expectancy, while increasing the allowable speed for changing between different capacitance values of the variable vacuum capacitor. Preferably, the mechanical drive system comprises a drive screw and a nut, wherein the nut is arranged in a housing of the vacuum capacitor, wherein the drive screw is screwed through the nut, wherein a first electrode is arranged on one side of the drive screw, wherein, by means of a rotation of the drive screw, the first electrode is movable relative to a second electrode.

According to an aspect of the present invention the nut of the mechanical drive system of a vacuum capacitor is at least partially manufactured from plastic material. In particular, such a drive system has the advantage that a high speed in the change of the capacitance of the variable vacuum capacitor can be achieved and that the durability of the drive system can be improved significantly.

In an embodiment variant, the nut is substantially manufactured fully out of plastic material. In particular, such a drive system has the advantage that the number of needed parts can be minimized.

In another embodiment variant, the part of the nut for screwing the drive screw through the nut is manufactured out of plastic material and the part of the nut for arranging the nut in the housing of the vacuum capacitor is manufactured out of metallic material. Such an embodiment has the advantage that the physical properties of the nut can be adapted to the physical properties of the material contacting the nut when installed.

In a further embodiment variant, the plastic material comprises a high performance plastic material. Such an embodiment has the advantage that a high performance plastic material with well known physical properties can be used for achieving desired results with respect to durability and speed of operation of the mechanical drive system.

In another embodiment variant, the plastic material comprises a high performance and high temperature up to 250° Celsius polymer plastic material with a friction factor of <0.1 @ 100° Celsius. Such an embodiment variant has the advantage that well known products may be used for achieving the desired results with respect to durability and speed of operation of the mechanical drive system.

In a further embodiment variant, the metallic material comprises a stainless steel. Such an embodiment has the advantage that a well known material for achieving durability and speed of operation can be used.

In another embodiment variant, the drive screw comprises a PVD (PVD: Physical Vapor Deposition) coating or a coating of a similar process, with a Vickers hardness of 6,000 HV or higher. Such an embodiment has the advantage that durability and speed of operation can be significantly improved.

BRIEF DESCRIPTION OF DRAWINGS

An embodiment of the present invention will be described in the following with references to an example. The example of the embodiment is illustrated by FIGS. 1 to 3:

In FIG. 1, the reference numeral 1 refers to a variable vacuum capacitor. The variable vacuum capacitor comprises a housing and insulator. A first electrode (not shown) and a second electrode (not shown) are arranged inside the housing and the insulator of the variable vacuum capacitor. For example, the first electrode may be attached to a drive screw, which has reference numeral 2 in FIG. 1, and the second electrode may be arranged opposite the first electrode in a fixed position relative to the housing of the variable vacuum capacitor. The capacitance of the variable vacuum capacitor is adjusted by means of a change of distance between the first electrode and the second electrode. In order to increase the active area, the first electrode and the second electrode may comprise ring electrodes or helical electrodes. The change in distance between the electrodes is performed by means of a mechanical drive system. In FIG. 1, the reference numeral 3 relates to a nut. The nut 3 is arranged in a fixed position relative to the housing of the variable vacuum capacitor. For example, the nut 3 may be attached to the housing by means of several screws. The drive screw 2 is screwed through the nut. Therefore, when the screw 2 is turned in one direction or the other, the first electrode is moved with respect to the housing and equally well with respect to the second electrode, leading to an increase or a decrease of the capacitance of the variable vacuum capacitor. In FIG. 1 the reference numeral 4 refers to a cap and the reference numeral 5 refers to a ball bearing. The cap 4 may be manufactured out of aluminium, for example. The ball bearing may be a standard ball bearing. The cap 4 and the ball bearing 5 may improve the quality of the mechanical drive system. The nut 3 comprises plastic material which, in contact with the drive screw 2, provides preferred physical properties, especially with respect to durability and speed of operation of the mechanical drive system.

In FIG. 2, a first embodiment of the nut is shown. In FIG. 2, the reference numeral 1 refers to a plastic cylinder of the nut and the reference numeral 2 refers to a metallic cylinder of the nut. The plastic cylinder 1 is arranged inside the metallic cylinder 2. The outer diameter of the plastic cylinder 1 may be a little bit larger, for example 1/10 mm, than the inner diameter of the metallic cylinder 2. The plastic cylinder 1 may be pressed into the metallic cylinder 2. The plastic cylinder 1 comprises a screw thread adapted to house the drive screw. The metallic cylinder 2 may comprise means, for example holes for housing screws, for arranging the nut in a housing of the variable vacuum capacitor.

In FIG. 3, a second embodiment of the nut is shown. In FIG. 3, the reference numeral 1 refers to a plastic component of the nut and reference numeral 2 refers to a metallic part of the nut. The metallic part 2 of the nut may be adapted to protect the plastic part 1 of the nut from forces applied by screws when the nut is arranged in a housing of the variable vacuum capacitor.

Figure 1:
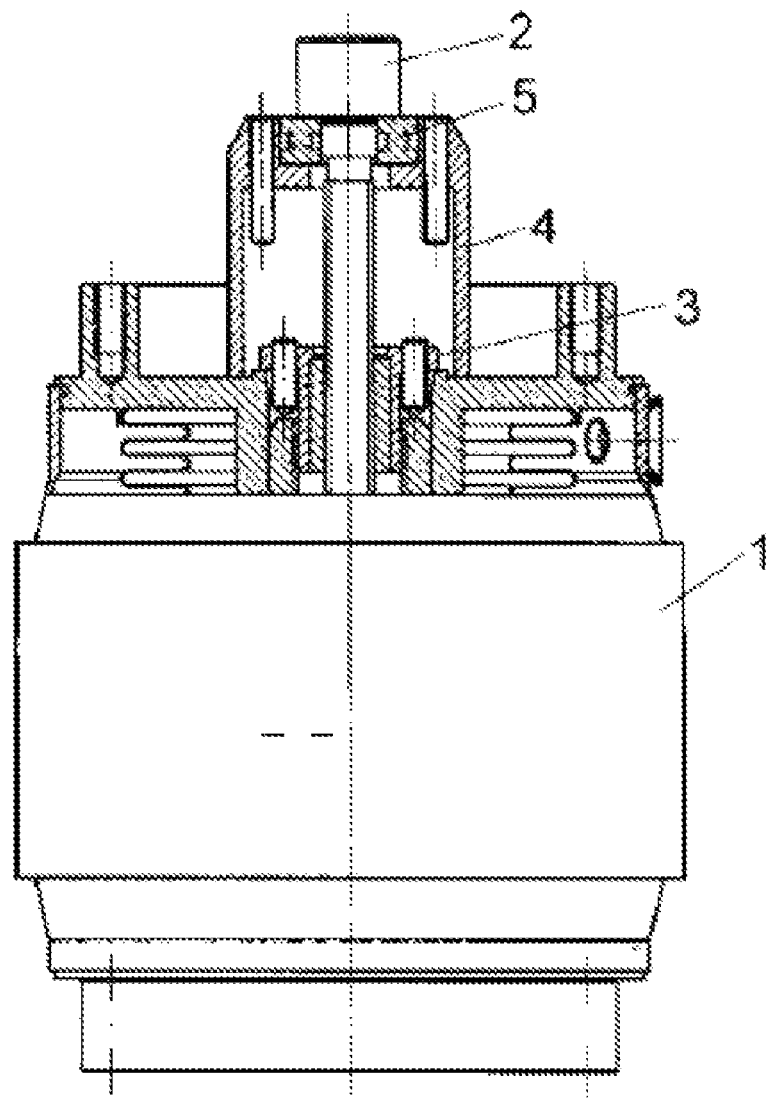
FIG. 1 shows a block diagram of a variable vacuum capacitor.
Figure 2:
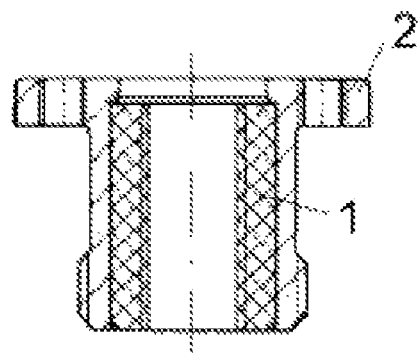
FIG. 2 shows a first embodiment variant of a nut.
Figure 3:
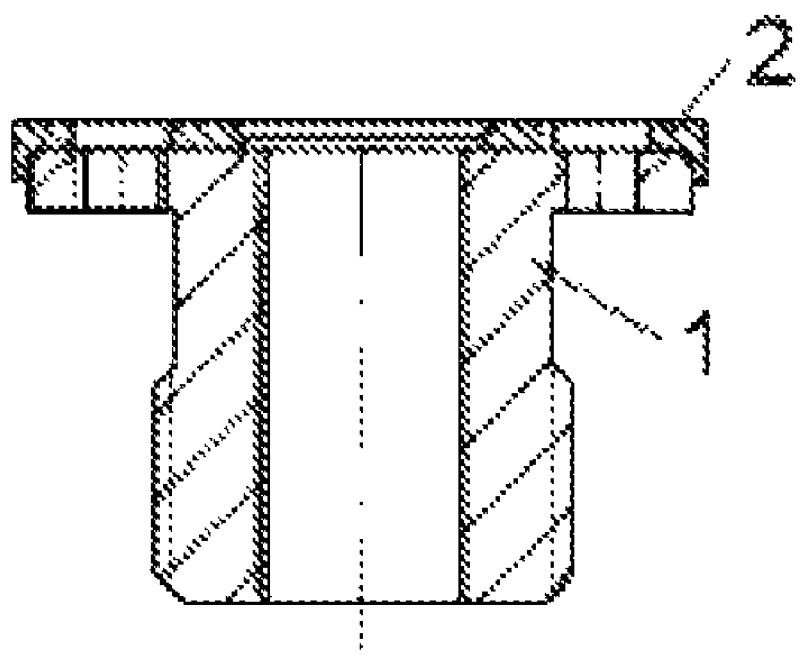
FIG. 3 shows a second embodiment variant of a nut.

When the mechanical drive system is installed, a lubricant may be applied to the drive screw, such that the friction between the drive screw and the nut is reduced further. Such a lubricant may comprise synthetic oil.

The drive screw may comprise a PVD (PVD: Physical Vapor Deposition) coating, which coating may be manufactured by means of well known methods and procedures.

The plastic material may be manufactured in such a manner that the variable vacuum capacitor may be operated in a temperature range from about 0° Celsius to about 125° Celsius. For example, the plastic material may comprise a high performance and high temperature polymer plastic material, which may have the following properties: maintenance free, wear-resistant, low friction, impact-resistant, vibration-resistant, well-priced, easy to process (e.g. chipping, grinding, burnishing), adapted to be glued or to be welded, anti-adhesive. The features of the plastic material may comprise: usable in a temperature range of −50° Celsius to 140° Celsius, maximal permissible temperature of 250° Celsius, dynamic coefficient of friction of <0.1 (for dry run @ a temperature of 100° Celsius), and wear factor of <0.15 mm/100 km.

The invention claimed is:

1. Mechanical drive system for a vacuum capacitor, which drive system comprises a drive screw and a nut, wherein the nut is arranged in a housing of the vacuum capacitor, wherein the drive screw is screwed through the nut, wherein a first electrode is arranged on one side of the drive screw, wherein, by means of a rotation of the drive screw, the first electrode is movable relative to a second electrode, wherein the nut is at least partially manufactured out of plastic material.

2. Mechanical drive system according to claim 1, wherein the nut is substantially manufactured fully out of plastic material.

3. Mechanical drive system according to claim 1, wherein a part of the nut for screwing the drive screw through the nut is manufactured out of plastic material and a part of the nut for arranging the nut in the housing of the vacuum capacitor is manufactured out of metallic material.

4. Mechanical drive system according to claim 1, wherein the plastic material has a wear factor of, 0.15 mm/100 km.

5. Mechanical drive system according to claim 1, wherein the plastic material comprises a high performance and high temperature up to 250° Celsius polymer plastic material with a friction factor <0.1 @ 100° Celsius.

6. Mechanical drive system according to claim 3, wherein the metallic material comprises a stainless steel.

7. Mechanical drive system according to claim 1, wherein the drive screw comprises a PVD (PVD: Physical Vapor Deposition) coating or a coating of a similar process, with a Vickers hardness of 6,000 HV or higher.

* * * * *